No. 778,726. PATENTED DEC. 27, 1904.
A. H. WEGENER.
NUT LOCK.
APPLICATION FILED AUG. 19, 1903. RENEWED OCT. 22, 1904.

Witnesses
J. L. Jenkins
S. Olivia Moore

Inventor
Arnold H. Wegener
By Edwin Guthrie
Attorney

No. 778,726.

Patented December 27, 1904.

UNITED STATES PATENT OFFICE.

ARNOLD H. WEGENER, OF NEW YORK, N. Y.

NUT-LOCK.

SPECIFICATION forming part of Letters Patent No. 778,726, dated December 27, 1904.

Application filed August 19, 1903. Renewed October 22, 1904. Serial No. 229,569.

*To all whom it may concern:*

Be it known that I, ARNOLD H. WEGENER, a citizen of the United States, residing at New York, in the county of New York and State of New York, have invented certain new and useful Improvements in Nut-Locks, of which the following is a specification.

My invention relates to nut-locks, and belongs to that variety of devices for preventing the loosening of the nut upon a bolt after having been set up to clamp any objects together or in position, which engage without injuring the threads of the bolt, and which will grip the threads at any point.

My invention falls more directly among those nut-locks wherein a clutch-block is forced against the threads by the wall of a convergent recess in the nut. When the clutch is forced into the smaller part of the recess, it binds against the threads and prevents further rotation or unscrewing of bolt or nut, but permits such rotation freely when the clutch element is moved into the larger part of the recess as the nut is screwed on.

The object of my invention is to construct a nut-lock of the sort designated having parts of special formation and arrangement whereby the slip or back motion of the nut when the clutch is caused to press against the threads is reduced to a minimum.

Another object of my invention is to provide means borne by the nut whereby it may be readily unlocked and removed.

I accomplish the objects stated by means of the parts and their association, as illustrated in the accompanying drawings, of which—

Figure 1:
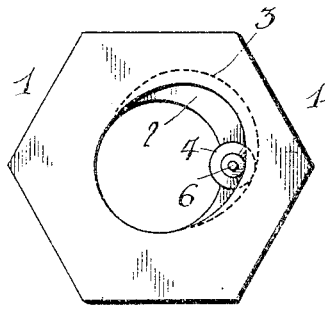
Figure 2:
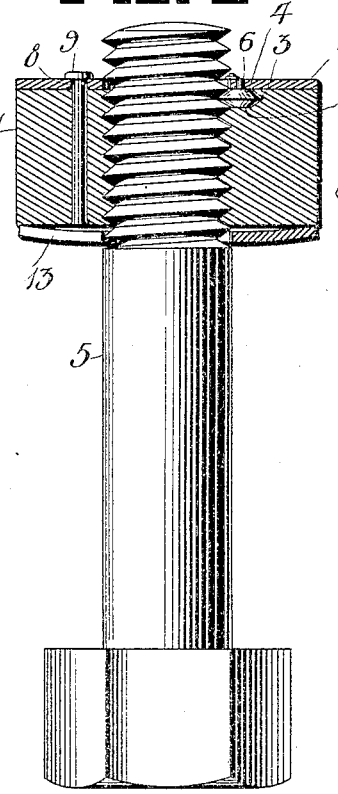
Figure 3:
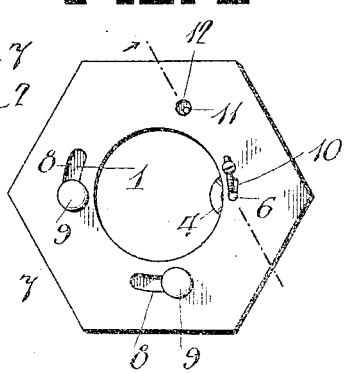
Figure 5:
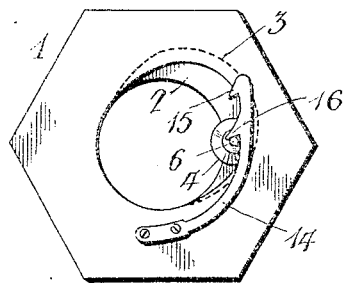
Figure 4:
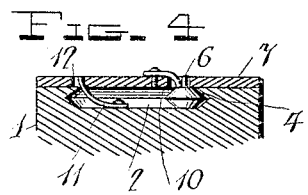
Figure 6:
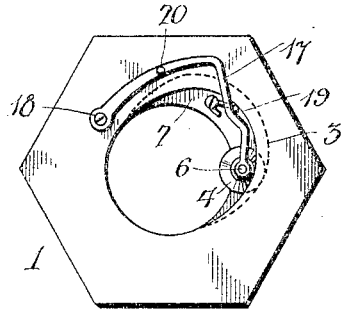

Figure 1 represents a top view of the nut, showing the eccentric crescent recess. Fig. 2 is a vertical section of the nut and bolt, exhibiting the clutch-disk engaging the thread of the bolt and correspondingly-grooved back wall of recess. Fig. 3 is a top view of the turning-washer for moving the disk and unlocking the nut. Fig. 4 represents a vertical section of the nut and washer, showing the spring which holds the washer yieldingly with respect to the nut and the spring holding the clutch-disk yieldingly with respect to the washer. Fig. 5 illustrates a modified construction for holding the clutch-disk, and Fig. 6 is a further modification representing devices for holding and moving the clutch-disk in the recess.

Like numbers refer to like parts throughout.

Considering the drawings, numeral 1 marks the nut having an eccentric curved recess 2 in the top, provided at the back with a V-shaped or thread-form groove 3. (See Fig. 2.)

Within the recess 2 is located the clutch-disk 4, the edge of which is formed to fit the threads of bolt 5 and groove 3 of the recess. Disk 4 possesses a projecting central stem or pintle 6, and it is by means of this pintle that the disk is moved when the nut is unlocked. The periphery of the disk corresponds in shape to the threads of bolt 5 and fits between them, engaging the threads without injury to them.

One manner of holding and moving the disk is by the turning-washer 7, having concentric slots 8 and held upon the top of the nut by headed rivets 9, let into the nut through the slots. An orifice 10 through the washer engages the pintle 6 and holds it vertical and the disk horizontal. Normally the flat coil-spring 11 in the recess and having one end engaging orifice 12 of the washer keeps the washer on all sides flush with the nut, as appears in Fig. 3. In this position the disk is held in a narrowing end of the recess 2 and in engagement with both the thread of the bolt and with groove 3 at the back of the recess. Any movement of nut or bolt with respect to each other tending to rotate the disk and to advance it into the narrowing end of the recess is resisted by the disk becoming jammed in the thread and groove 3. The parts are arranged in such manner that the movement of unscrewing the nut causes the disk to jam and the unscrewing movement is prevented. Oppositely turning the nut rolls the disk into the broader portion of the recess and free movement in that direction is allowed. Thus the screwing up of the nut meets no resistance, while the unscrewing is instantly checked and the nut locked until the disk is moved to the broad portion of the recess by rotating washer 7 with the arrow, as shown in Fig. 3, into the position indicated by the broken lines. Attention is here called to the fact that in addition to the grip of the disk due to the lessening area between the bolt-threads and groove 3 the effort tending to unscrew the nut exerts a downward pressure of the thread upon the double-beveled edge of the disk and materially augments its holding power.

In the use of my invention whenever the parts clamped together afford the least elastic reaction to the pressure of the nut it will hold continuously against any ordinary displacing jar. When the parts clamped are entirely dead—that is to say, perfectly rigid—a spring-washer 13 may be used advantageously below the nut. (See Fig. 2.)

Other means for holding disk 4 are occasionally employed by me. (See Figs. 5 and 6.) The modification illustrated in Fig. 5 comprises the curved spring-hook 14, having one end secured to nut 1. Two inwardly-directed hook-points 15 and 16 are provided. When pintle 6 of the clutch-disk engages hook 15, the disk lies in the broad portion of recess 3 and the nut can be turned either way. If, however, spring-hook 14 is raised slightly and the pintle caused to engage hook-point 16, the unscrewing movement of nut 1 tends to rotate the disk toward the narrowing area of recess 3 and the movement is at once stopped, as explained. As before stated, the screwing of the nut on the bolt is not resisted.

In Fig. 5 the modification delineated includes the bent lever 17, swinging on pivot 18 and having one end pierced by an orifice engaging the pintle of disk 4, the disk being held in the narrowing part of recess 3 by force of C-spring 19 acting upon the lever. The operation is the same as that described for washer 7. As the parts lie in Fig. 5 the unscrewing movement is obstructed. By pressing on the outer end 20 of the lever, disk 4 is moved into the wider area of recess 3, and the nut can be turned either on or off the bolt.

Having thus described my invention, what I claim is—

1. In a nut-lock, the combination with a bolt, of a nut engaging the bolt and having a narrowing recess, the back wall of said recess having a groove corresponding in form to the threads of the bolt, a clutch movable in said recess and having peripheral surfaces corresponding in form to the threads of the bolt and the groove of said recess, the said clutch being arranged to simultaneously engage the threads of the bolt and groove of said recess.

2. In a nut-lock, the combination with a bolt, of a nut engaging the bolt and having a narrowing recess, the back wall of said recess having a groove corresponding in form to the threads of the bolt, a disk clutch movable in the said recess and having its periphery corresponding in form to the threads of the bolt and groove of said recess, said disk being arranged to engage the threads of the bolt and groove of said recess.

3. In a nut-lock, the combination with a bolt, of a nut engaging the bolt and having a narrowing recess, the back wall of said recess having a groove corresponding in form to the threads of the bolt, a disk clutch movable in the said recess and having its periphery corresponding in form to the threads of the bolt and groove of said recess, said disk being arranged to engage the threads of the bolt and groove of said recess, and devices whereby the said disk is yieldingly held in said recess.

4. In a nut-lock, the combination with a bolt, of a nut engaging the bolt and having a narrowing recess, the back wall of said recess having a groove corresponding in form to the threads of the bolt, a disk clutch movable in the said recess and having its periphery corresponding in form to the threads of the bolt and groove of said recess, said disk being arranged to engage the threads of the bolt and groove of said recess, devices whereby said disk is yieldingly held in said recess, and means for moving the said disk in the recess.

5. In a nut-lock, the combination with a bolt, of a nut engaging the bolt and having a narrowing recess provided with a thread-form groove, a clutch-disk in said recess having its periphery shaped to engage the groove of said recess and the threads of the bolt, said disk having also a pintle 6, a washer movably secured to the nut and having an orifice engaging the pintle of said disk, and a spring arranged to hold the pintle of said disk yieldingly in the orifice of said washer, substantially as described.

In testimony whereof I affix my signature in presence of two witnesses.

ARNOLD H. WEGENER.

Witnesses:
GEORGE BAKER,
GUSTAVE FREY.